(12) United States Patent
Motto et al.

(10) Patent No.: US 12,427,894 B1
(45) Date of Patent: Sep. 30, 2025

(54) VEHICLE SEAT OCCUPANCY SENSOR

(71) Applicant: RB Distribution, Inc., Colmar, PA (US)

(72) Inventors: Thomas Motto, Conshohocken, PA (US); Katherine Davis, Royersford, PA (US); Marc DiGregorio, Gap, DE (US)

(73) Assignee: RB Distribution, Inc., Colmar, PA (US)

( * ) Notice: Subject to any disclaimer, the term of this patent is extended or adjusted under 35 U.S.C. 154(b) by 0 days.

(21) Appl. No.: 18/665,090

(22) Filed: May 15, 2024

(51) Int. Cl.
*B60N 2/00* (2006.01)

(52) U.S. Cl.
CPC .................. *B60N 2/002* (2013.01)

(58) Field of Classification Search
CPC ........................................ B60N 2/002
See application file for complete search history.

(56) References Cited

U.S. PATENT DOCUMENTS 9,018,546 B2 * 4/2015 Kawahira ............ H01H 13/18
177/136

FOREIGN PATENT DOCUMENTS

| CN | 104494487 B | * | 11/2017 | ............ B60N 2/002 |
| CN | 111791824 A | * | 10/2020 | |
| DE | 102004002479 A1 | * | 8/2005 | ............ B60N 2/002 |
| JP | 2008305809 A | * | 12/2008 | ............ B60N 2/002 |
| WO | WO-2021151835 A1 | * | 8/2021 | ............ B60N 2/002 |

* cited by examiner

*Primary Examiner* — Drew J Brown
(74) *Attorney, Agent, or Firm* — Quarles & Brady LLP; James J. Aquilina (57) ABSTRACT

A seat occupancy sensor for use in a vehicle is disclosed.

20 Claims, 6 Drawing Sheets

VEHICLE SEAT OCCUPANCY SENSOR

FIELD OF THE DISCLOSURE

The present disclosure relates to the field of seat occupancy sensors for use in vehicle seating systems, and more particularly to a seat occupancy sensor with two or more circuit branches.

BACKGROUND

Seat occupancy sensors typically include one or more traces (e.g., wires) attached to sensors which are configured to transmit electrical current through the traces to communicate to a seat occupancy sensor when a seat (e.g., a vehicle seat) is occupied. However, typical seat occupancy sensors may cease functioning when one or more of the traces are damaged or cut. The present inventive concepts address this and other shortcomings of the prior art devices.

BRIEF DESCRIPTION OF THE DRAWINGS

The seat occupancy sensor according to the present disclosure is further described with reference to the accompanying drawings, in which.

SUMMARY OF THE INVENTIVE CONCEPTS

In one respect, the inventive concept is a seat occupancy sensor configured to function even when a portion of the sensor is damaged. The sensor includes a junction, a first circuit branch, the first circuit branch extending from the junction, a second circuit branch, the second circuit branch extending from the junction, wherein the junction, the first circuit branch, and the second circuit branch together form a circuit loop including a first trace and a second trace, the first trace and the second trace being connected via a contact switch arranged on the circuit loop, the contact switch having a closed position in which the first trace and the second trace are in contact with another and an open position in which the first trace and the second trace are not in contact with another.

In another respect, the inventive concept is a seat occupancy sensor configured to function even when a portion of the sensor is damaged. The sensor includes a sensor mat, the sensor mat including a first trace, a second trace, and a contact switch, the first trace and the second trace being connected via the contact switch, the contact switch having a closed position in which the first trace and the second trace are in contact with one another and an open position in which the first trace and the second trace are not in contact with one another, a junction, a first circuit branch, the first circuit branch including a first end connected to the junction, and a second circuit branch, the second circuit branch including a first end connected to the junction, wherein the junction, the first circuit branch, and the second circuit branch together form a first circuit loop including both the first trace and the second trace.

In another respect, the inventive concept is a seat occupancy sensor configured to function even when a portion of the sensor is damaged. The sensor includes a first sensor trace and a second sensor trace extending to a junction, a first branch including first and second first branch traces extending from the junction with the first branch first trace electrically connected to the first sensor trace and the first branch second trace electrically connected to the second sensor trace, a second branch including first and second second branch traces extending from the junction with the second branch first trace electrically connected to the first sensor trace and the second branch second trace electrically connected to the second sensor trace, and a pressure sensor electrically connected to the first and second first branch traces and electrically connected to the first and second second branch traces.

DETAILED DESCRIPTION

The ensuing detailed description provides exemplary embodiment(s) only, and is not intended to limit the scope, applicability, or configuration of the herein disclosed embodiment(s). Rather, the ensuing detailed description of the exemplary embodiment(s) will provide those skilled in the art with an enabling description for implementing the exemplary embodiments in accordance with the present disclosure. It should be understood that various changes may be made in the function and arrangement of elements without departing from the spirit and scope of the invention, as set forth in the appended claims.

The following detailed description is to be read with reference to the figures, in which like elements in different figures have like reference numerals. The figures, which are not necessarily to scale, depict selected examples and are not intended to limit the scope of examples of the disclosure.

To aid in describing the disclosure and/or invention as claimed, directional terms may be used in the specification and claims to describe portions of the present disclosure and/or invention (e.g., upper, lower, left, right, etc.). These directional definitions are merely intended to assist in describing the embodiment(s) and claiming the invention, and are not intended to limit the disclosure or claimed invention in any way. In addition, reference numerals that are introduced in the specification in association with a drawing figure may be repeated in one or more subsequent figures without additional description in the specification, in order to provide context for other features.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "adapter ring 100" series reference numeral will likely first appear in FIG. 1, an element identified by a "200" series reference numeral will likely first appear in FIG. 2, and so on.

It should be understood that when an element is referred to as being "connected" or "coupled" to another element, it can be integral with the other element, directly connected or coupled to the other element, or that intervening elements may be present. In contrast, when an element is referred to as being "directly connected" or "directly coupled" to another element, it should be understood that no intervening elements are present. Other words used to describe the relationship between elements should be interpreted in a like fashion (e.g., "between" versus "directly between," "adjacent" versus "directly adjacent," etc.).

In embodiments described herein or shown in the drawings, any direct electrical connection or coupling, i.e., any connection or coupling without additional intervening elements, may also be implemented by an indirect connection or coupling, i.e., a connection or coupling with one or more additional intervening elements, or vice versa, as long as the general purpose of the connection or coupling, for example, to transmit a certain kind of signal or to transmit a certain kind of information, is essentially maintained. Features from different embodiments may be combined to form further embodiments. For example, variations or modifications described with respect to one of the embodiments may also be applicable to other embodiments, unless noted to the contrary.

To facilitate a robust seat occupancy sensor system, it may be beneficial to have a seat occupancy sensor that is able to operate even when a portion of the system is cut or otherwise damaged. In one example, a seat occupancy sensor may include a sensor mat including one or more contact switches (e.g., pressure sensors) having multiple (e.g., dual) connections to each of a positive trace (e.g., a first trace) and a negative trace (e.g., a second trace) of the seat occupancy sensor. Put differently, the contact switches may have multiple connections to the inflow of current from a power source (e.g., a vehicle battery, processor, or other power source) and multiple connections to the return of current to the power source (e.g., to complete the circuit). Thus, if one of the multiple connections to the power source is damaged, the contact switches may continue to function via the other, redundant connection to the power source.

In one example, this redundant connection to the contact switches is facilitated via a pair of parallel circuit branches (e.g., a first branch and a second branch) extending away from a junction (e.g., a reference junction) of the seat occupancy sensor. In one example, this arrangement forms a circuit loop from the reference junction through the first and second circuit branches and returning to the reference junction. In one non-limiting example, the circuit loop may define a substantially rectangular shape, with the first and second circuit branches parallel to each other. In addition to the circuit loop formed by the reference junction, first circuit branch, and second circuit branch, each of the first circuit branch and the second circuit branch may include a separate, independent circuit loop.

In one example, due to the redundancy in the sensor mat, the traces (e.g., the positive and negative traces) may be connected to the contact switches via two separate routes, which permits the seat occupancy sensor to function even when one of the routes to the contact switch (e.g., via the traces) is damaged. Thus, even if a portion of the seat occupancy sensor is damaged, the seat occupancy sensor can continue to function.

Figure 1:
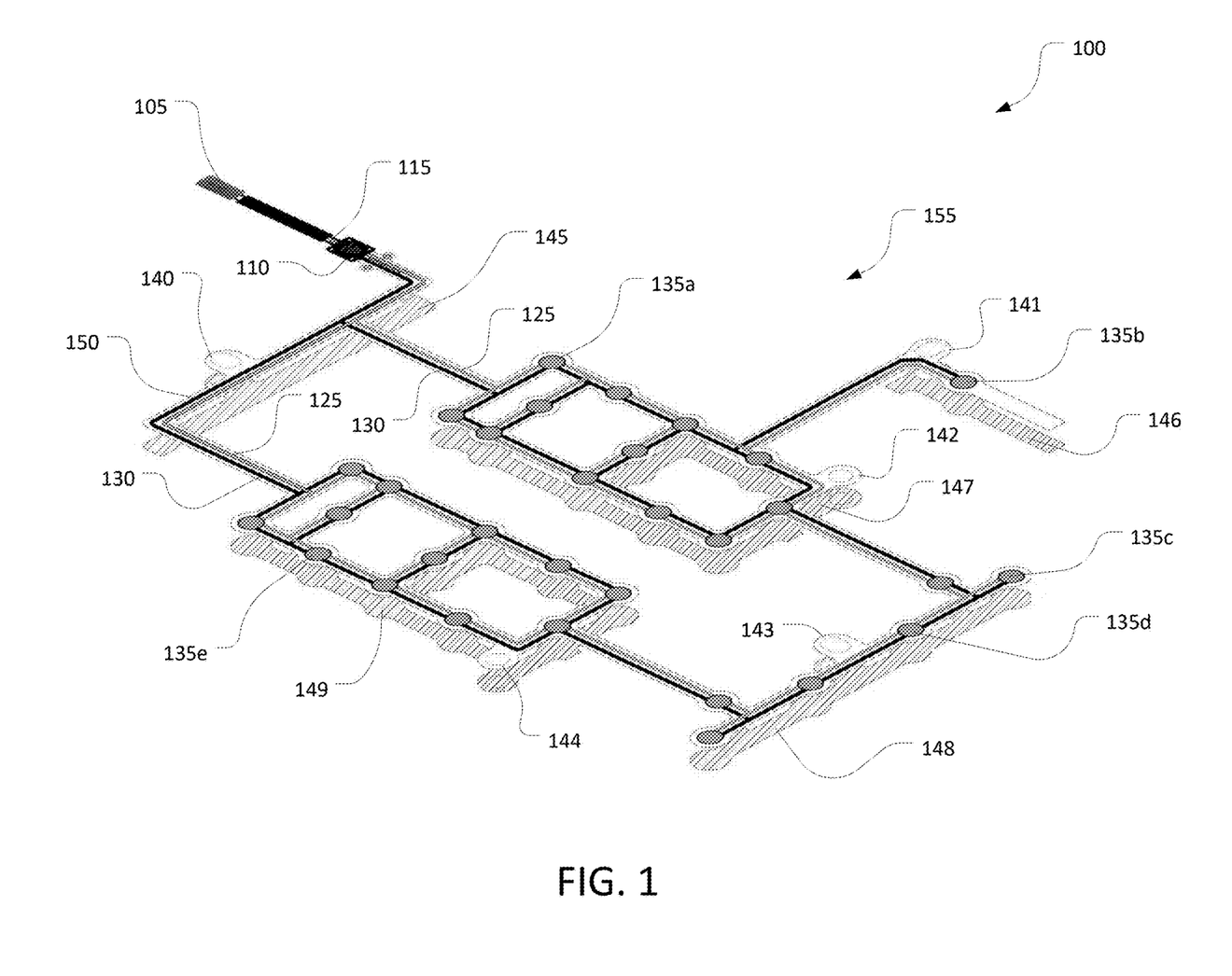
FIG. 1 is a perspective view of a seat occupancy sensor according to the present disclosure.
Figure 2:
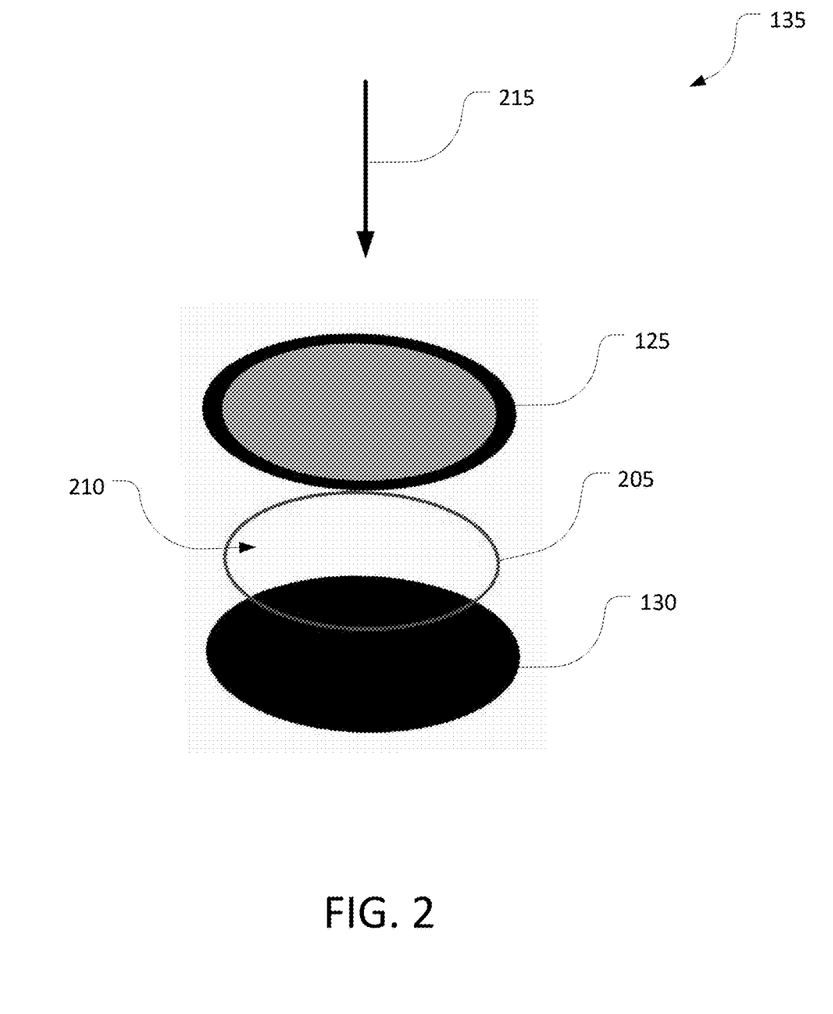
FIG. 2 is diagrammatic view of a contact switch of the seat occupancy sensor of FIG. 1.

FIGS. 1 and 2 show one example of a seat occupancy sensor 100 for use in a vehicle (e.g., an automobile, tractor, agricultural vehicle, etc.) according to the present disclosure. In one example, the seat occupancy sensor 100 may include a sensor mat 155, which permits operation of the seat occupancy sensor 100 even when the sensor mat 155 is damaged (e.g., if traces are cut, crushed, or otherwise damaged, or malfunction). In one example, the sensor mat 155 may include one or more contact switches (e.g., contact switches 135*a*, 135*b*, 135*c*, 135*d*, 135*e*). In one particular example, the sensor mat 155 may include contact switches (e.g., contact switches 135*a*, 135*d*, 135*e*) with multiple connections (e.g., more than one connection) to each of a positive trace 125 and a negative (e.g., ground) trace 130 of the seat occupancy sensor 100. Thus, even if one electrical connection between the traces 125, 130 and the contact switches 135*a*, 135*d*, 135*e* is damaged, the respective contact switch 135*a*, 135*d*, 135*e* can continue to function via the redundant (e.g., additional) electrical connection(s) to the traces 125, 130. In another example, the contact switches may be in the form of pressure sensors, toggle switches, pushbutton switches, or any other known sensors/switches.

In one example, the seat occupancy sensor 100 includes a connector 105 that is used to electrically connect the seat occupancy sensor 100 to a computer system of the vehicle (e.g., an Electronic Control Unit ("ECU"), Controller Area Network ("CAN"), or the like). The connector 105 may be electrically connected to a terminal block 110 via one or more wires 115, which may be encapsulated within a cable or other protective sheath. In one example, the seat occupancy sensor 100 may receive power (e.g., electrical current) from the vehicle via the one or more wires 115. In one particular example, the wires 115 may include both a positive wire and a negative (e.g., ground) wire. The positive wire may transfer electrical current from a power source to the seat occupancy sensor 100, while the negative wire may return the electrical current from the seat occupancy sensor 100 to the power source to complete the circuit. In one particular example, the power source may supply a voltage of about 5 volts to the seat occupancy sensor 100.

Figure 5:
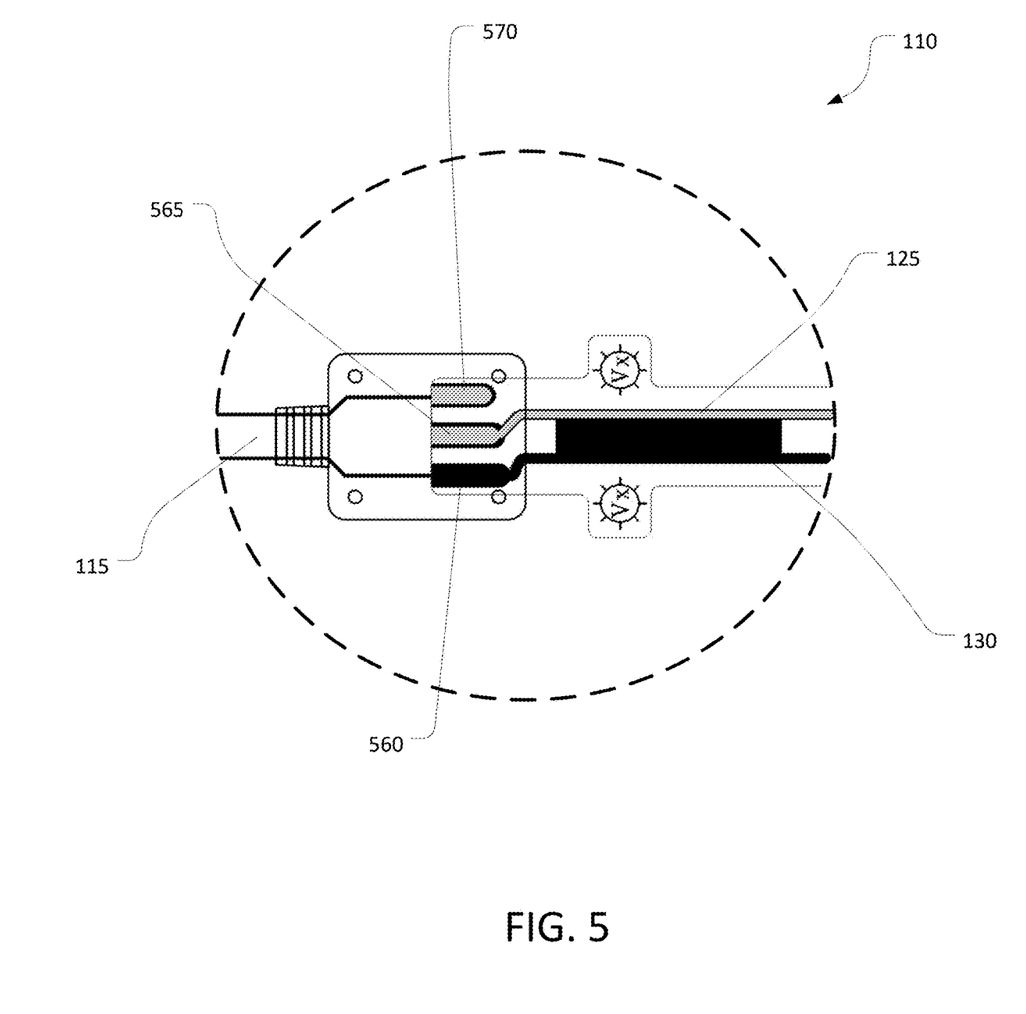
FIG. 5 is an enlarged, interior view of the portion of the terminal block of the seat occupancy sensor labeled "5-5" in FIG. 4.

In one example, as shown in FIG. 5, the wires 115 may terminate at the terminal block 110 at one or more terminals. For example, the positive wire may terminate at a positive terminal 565 of the terminal block 110 and the negative (e.g., ground) wire may terminate at a negative terminal 560 of the terminal block 110. In some examples, the terminal block 110 may include an additional terminal 570, which may provide additional connection points for additional wires or traces. In one example, one or more electrical traces may extend from the electrical terminals 560, 565 to form the sensor mat 155 of the seat occupancy sensor 100. For example, the positive trace 125 may extend from the positive terminal 565 and the negative trace 130 may extend from the negative terminal 560. In one example, the sensor mat 155 may be positioned within a vehicle seat (e.g., between a seat cover and seat padding) so that the seat occupancy sensor 100 may indicate when an occupant's weight is present on the seat. For example, the one or more contact switches 135*a*-135*e* arranged throughout the sensor mat 155 may respond to the presence of an occupant to indicate when an occupant's weight is present on the seat.

As mentioned above, the seat occupancy sensor 100 may include a pair of electrical traces including the positive trace 125 and the negative trace 130, which may each be sandwiched between or printed on a protective film 150 (e.g., a polycarbonate film). In one example, the positive trace 125 and the negative trace 130 may meet at each of the contact switches (e.g., contact switches 135*a*-135*e*) throughout the sensor mat 155. In one example, electrical current may flow into the sensor mat 155 via the positive trace 125, but the positive trace 125 and the negative trace 130 may be disconnected at each of the contact switches (e.g., forming an open circuit). Thus, when an occupant sits on (or other sufficient mass is applied to) the vehicle seat, a force is applied to the sensor mat 155 in the direction shown by arrow 215 in FIG. 2. When this force is applied to the sensor mat 155, the positive trace 125 may be deformed or pressed to pass through an opening 210 formed in an insulating film 205 arranged between the traces 125, 130. When the positive trace 125 passes through the opening 210 and thereby makes contact with the negative trace 130, the contact switch closes and completes the circuit of the seat occupancy sensor 100. Thus, the seat occupancy sensor 100 may then indicate that an occupant (or another significant mass/pressure) is present on the vehicle seat.

In one example, the seat occupancy sensor 100 may be positioned within a vehicle seat, with the sensor mat 155 secured to the foam padding of the seat via a permanent or removeable adhesive (e.g., glue, two-sided tape, or hook-and-loop fastener), positioned between the sensor mat 155 and the foam padding. In some examples according to the present disclosure, the sensor mat 155 may be secured to the foam padding of the seat via one of more sections of adhesive (e.g., adhesive sections 145, 146, 147, 148, 149). In some examples, the film 150 around the traces 125, 130 may include one or more mounting tabs (e.g., mounting tabs 140, 141, 142, 143, 144), which provide additional points of contact between the sensor mat 155 and the adhesive 145. In other examples, the mounting tabs 140, 141, 142, 143, 144 may receive a fastener (e.g., a screw, nail, bolt, or any other known fastener) to further secure the sensor mat 155 to the vehicle seat. In alternative embodiments, adhesive may be omitted and only attachment points for fasteners (e.g., mounting tabs 140-144) could be used.

Figure 3:
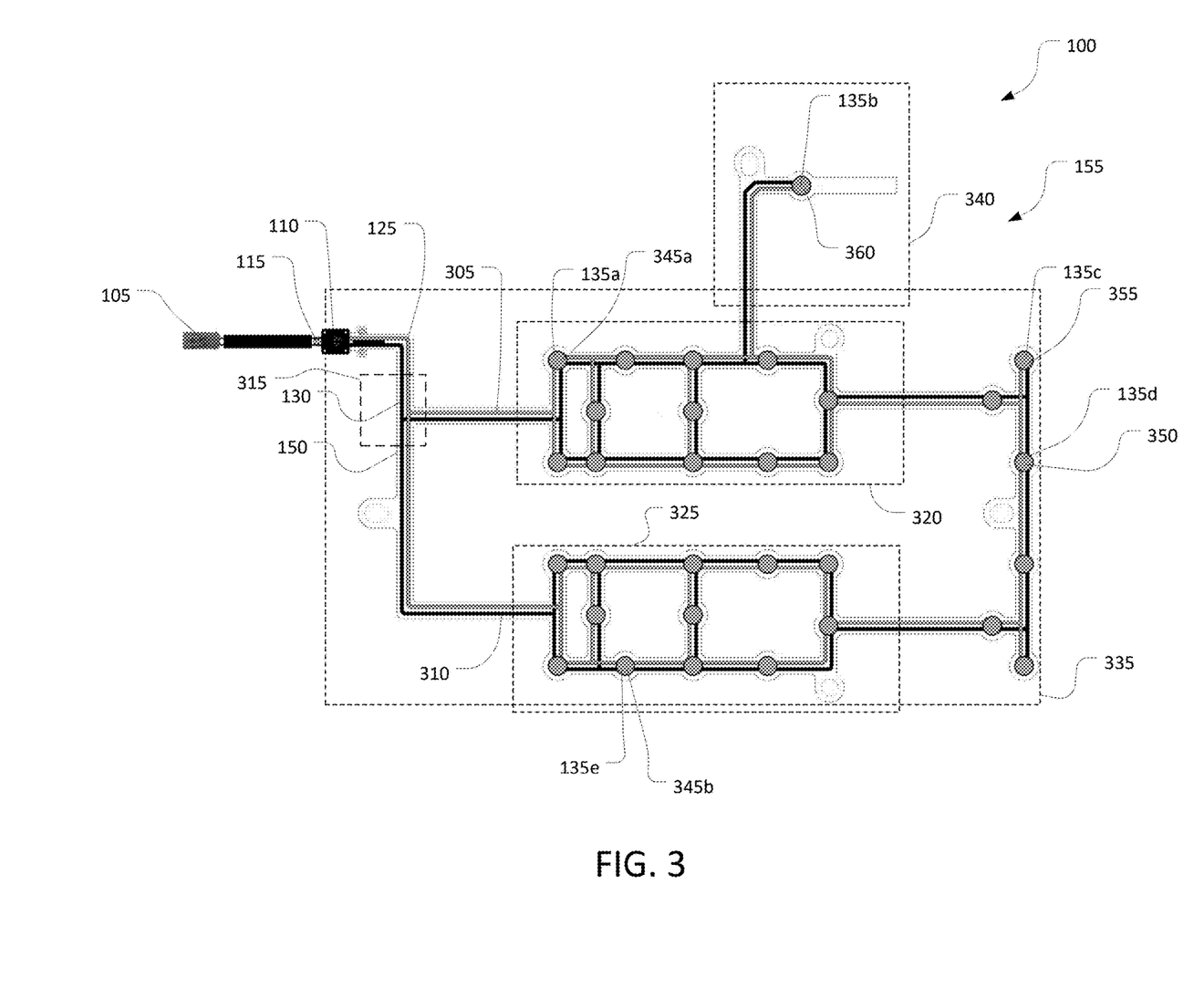
FIG. 3 is a diagrammatic view of the seat occupancy sensor of FIG. 1.

FIG. 3 shows a schematic diagram of the seat occupancy sensor 100, including the sensor mat 155 having the contact switches 135a-135e (e.g., pressure sensors) arranged throughout the sensor mat 155. As discussed previously, the contact switches 135a-135e may serve as contact points (e.g., electrical contacts) between the positive trace 125 and the negative trace 130, which may selectively complete the circuit (e.g., between the traces 125, 130) and signal to the vehicle that an occupant is present on the vehicle seat.

In the present example, the seat occupancy sensor 100 may include a reference junction 315 that separates or diverges into a first circuit branch 305 and a second circuit branch 310 extending away from the reference junction 315. In this example, the first circuit branch 305 and the second circuit branch 310 may each form independent circuit loops to facilitate operation of the seat occupancy sensor 100 even when one of the loops may be rendered inoperable. For example, the first branch 305 may include a first circuit loop 320 and the second branch 310 may include a second circuit loop 325. In this example, both the first branch 305 and the second branch 310 may extend from the reference junction 315. As a result, the combination of the reference junction 315, the first branch 305, and the second branch 310 may form a third circuit loop 335, which encompasses both the first and second circuit loops 320, 325.

As both the first circuit branch 305 and the second circuit branch 310 are connected via the reference junction 315, each contact switch (e.g., contact switch 135a, 135e) in the first loop 320 and the second loop 325 include multiple (e.g., redundant) connections to the traces 125, 130. For example, the contact switches 135a and 135e may be multi-connection contact switches 345a, 345b, each of which includes two connections to the positive trace 125 and two connections to the negative trace 130 so that the contact sensor may still function if one of the electrical connections is damaged. In one example, one of the connections to the traces 125, 130 may be direct, through the respective first or second branch 305, 310, while the other connection may be indirect through the respective opposite branch 305, 310. Correspondingly, the contact switch 135d, which may be a multi-connection contact switch 350, includes two connections to the positive trace 125 and two connections to the negative trace 130 so that the contact switch may still function when one of the connections is damaged. In other examples, the multi-connection contact switch 350 may include more than two connections to the positive trace 125 and two connections to the negative trace 130 (e.g., three, four, or more connections). In one example, the contact switch 135c may be a single-connection contact switch 355 including only one connection to the positive trace 125 and one connection to the negative trace 130, such that it may not function when one of the connections is damaged.

In the present example, the first circuit loop 320 includes a third circuit branch 340 extending away from the first circuit loop 320. However, in this example, the third circuit branch 340 includes a contact switch 135b, which is a single-connection contact switch 360 including only one connection to the positive trace 125 and one connection to the negative trace 130, such that it may not function when one of the connections is damaged.

In one example, due to the redundancy present in the seat occupancy sensor 100 (e.g., due to the parallel first and second branches 305, 310) the seat occupancy sensor 100 may continue to operate even when damaged. For example, if an occupant were to damage (e.g., crush or cut) a trace (e.g., trace 125, 130) in either the first branch 305 or the second branch 310, the seat occupancy sensor 100 will continue to operate, since each contact switch (e.g., contact switches 135a, 135e) within the first branch 305 and the second branch 310 are multi-connection contact switches (e.g., multi-connection contact switches 345a, 345b), i.e., have redundant connections to each of the positive trace 125 and the negative trace 130.

Figure 4:
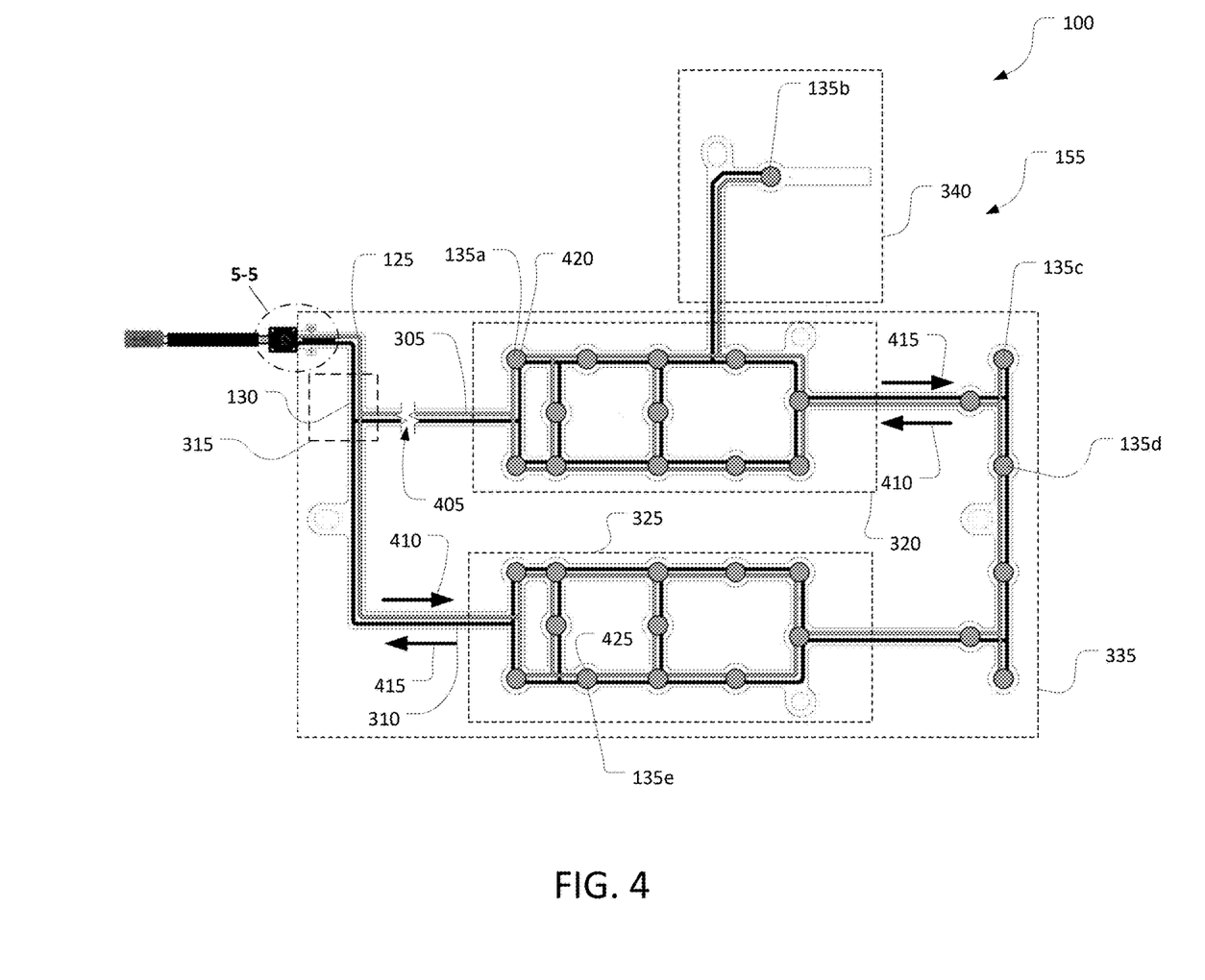
FIG. 4 is a diagrammatic view of a damaged seat occupancy sensor of FIG. 1.

For illustrative purposes, an example of the seat occupancy sensor 100 with a broken trace is illustrated in FIG. 4. For example, the first branch 305 may include damage in the form of a break 405 in the traces 125, 130, which creates an open circuit and prevents the flow of current into the first loop 320 via the connection between the first branch 305 and the reference junction 315. However, because the first branch 305 is additionally connected the reference junction 315 through the second branch 310 (e.g., forming the third loop 335), the contact switches (e.g., contact switch 420) in the first loop 320 are able to receive current from the traces 125, 130 through the second branch 310, as shown by the direction of arrows 410, 415. Put differently, even though the first branch 305 is damaged (e.g., an open circuit is formed), the contact switch 420 in the first loop 320 may still receive current flow from the traces 125, 130 via the second branch 310, which permits the contact switches in the first branch 305 to continue to function. Similarly, if the second branch 310 was damaged, a contact switch (e.g., contact switch 425) in the second loop 325 may still receive current flow from the traces 125, 130 via the first branch 305, which permits the contact switches in the second branch 310 to continue to function.

Figure 6:
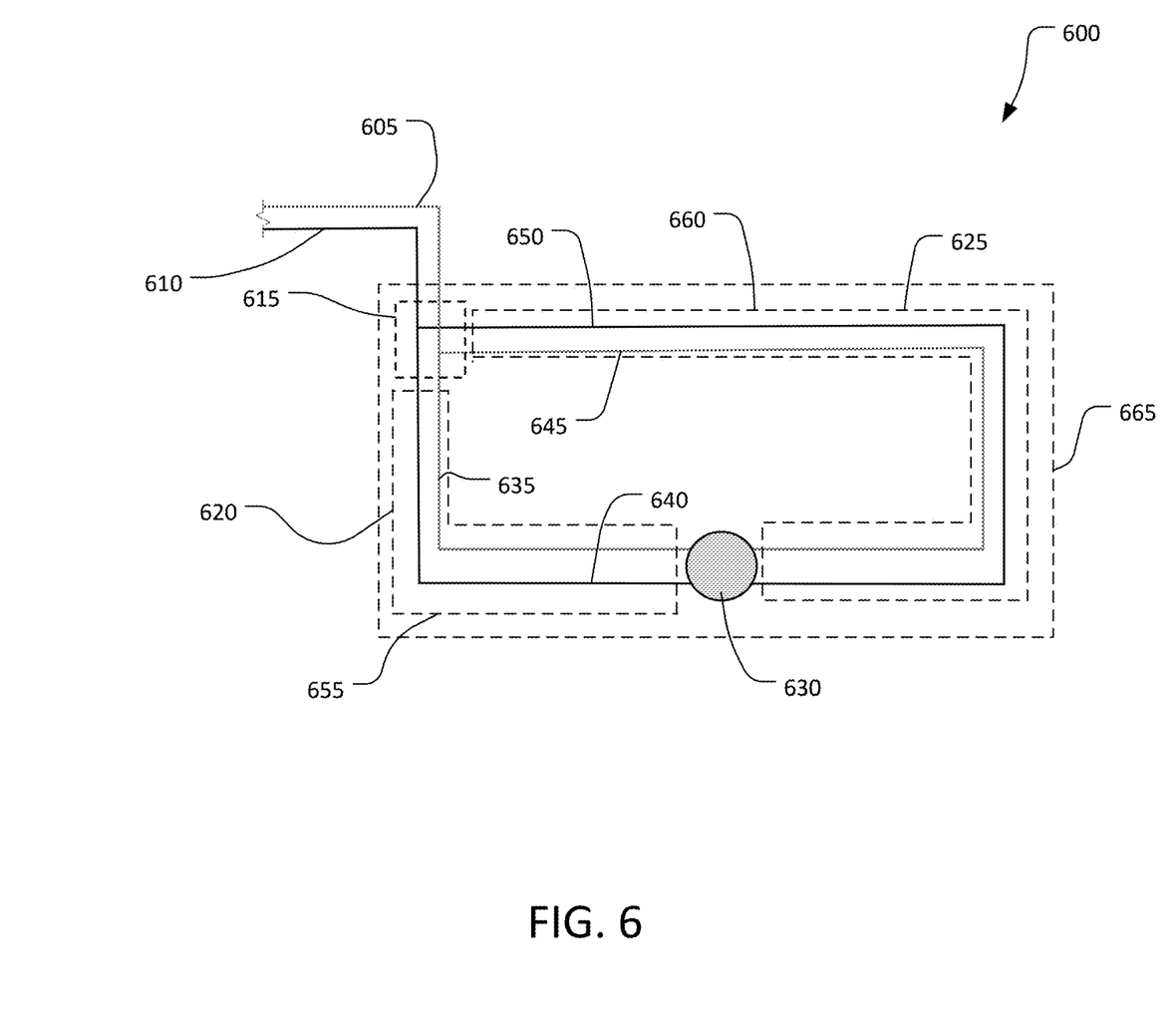
FIG. 6 is a diagrammatic view of another example of a seat occupancy sensor according to the present disclosure.

FIG. 6 illustrates another example of a seat occupancy sensor 600. As will be recognized, the seat occupancy sensor 600 shares a number of components in common with and operates in a similar fashion to the examples illustrated and described previously. For the sake of brevity, these common features will not be again described below in detail. Rather, previous discussion of commonly named or numbered features, unless otherwise indicated, also applies to example configurations of the seat occupancy sensor 600.

In one example, the seat occupancy sensor 600 includes a first sensor trace 605 (e.g., a positive trace) and a second sensor trace 610 (e.g., a negative trace), which extend into a junction 615. In one example, a first branch 620 and a second branch 625 may each extend from the junction 615 to a contact switch 630 (e.g., a pressure sensor).

The first branch 620 may include a first branch first trace 635 (e.g., a positive trace) and a first branch second trace 640 (e.g., a negative trace) extending from the junction 615. As should be appreciated, the first branch first trace 635 may be electrically connected to the first sensor trace 605 and the first branch second trace 640 may be electrically connected to the second sensor trace 610. Further, the first branch 620 may extend between the junction 615 and the contact switch 630 to provide a first current loop 655 for the contact switch 630.

Correspondingly, the second branch 625 may include a second branch first trace 645 (e.g., a positive trace) and a second branch second trace 650 (e.g., a negative trace) extending from the junction 615. As should be appreciated, the second branch first trace 645 may be electrically connected to the first sensor trace 605 and the second branch second trace 650 may be electrically connected to the second sensor trace 610. Further, the second branch 625 may extend between the junction 615 and the contact switch 630 to provide a second current loop 660 for the contact switch 630.

In another example, both the first branch 620 and the second branch 625 together may define a third current loop 665 for the contact switch 630. Thus, the contact switch 630 may include redundant electrical connections, which permits continued function of the contact switch 630 (and thus the occupancy sensor 600) even when the traces of the first branch 620 or the second branch 625 are damaged.

For example, in a first use case without any damage to the first branch 620 or the second branch 625, the contact switch 630 may function via the first loop 655, the second loop 660, or the third loop 665. In another use case, with damage to the first branch 620, but not to the second branch 625, the contact switch 630 may function via the second loop 660, but not via the first loop 655 or the third loop 665. Correspondingly, in yet another use case, with damage to the second branch 625, but not to the first branch 620, the contact switch 630 may function via the first loop 655, but not via the second loop 660 or the third loop 665.

Thus, due to the redundancy provided to the contact switch 630 via multiple (e.g., dual) connections to both positive traces (e.g., via the first branch first trace 635 and the second branch first trace 645) and multiple (e.g., dual) connections to both negative traces (e.g., via the first branch second trace 640 and the second branch second trace 650), the contact switch 630 (and thus the occupancy sensor 600) may continue to function even when damaged (e.g., cut or otherwise damaged).

As should be appreciated, the above seat occupancy sensors (e.g., seat occupancy sensors 100, 600) are merely illustrative examples of the inventive concept and are not limiting in terms of the number, layout, or orientation of the contact switches, loops, nodes, traces, or branches. Put differently, various differently layouts of the seat occupancy sensors, including different numbers of contact switches, loops, nodes, traces, or branches are envisioned. Further, in some examples, it should be appreciated that the number of contact switches including redundant connections to the positive and negative traces is at least a majority of the contact switches. However, in other examples, it is envisioned that the number of contact switches including redundant connections to the positive and negative traces may be less than a majority of the contact switches.

In some implementations, devices or systems disclosed herein can be utilized, manufactured, or installed using methods embodying aspects of the invention. Correspondingly, any description herein of particular features, capabilities, or intended purposes of a device or system is generally intended to include disclosure of a method of using such devices for the intended purposes, a method of otherwise implementing such capabilities, a method of manufacturing relevant components of such a device or system (or the device or system as a whole), and a method of installing disclosed (or otherwise known) components to support such purposes or capabilities. Similarly, unless otherwise indicated or limited, discussion herein of any method of manufacturing or using for a particular device or system, including installing the device or system, is intended to inherently include disclosure, as embodiments of the invention, of the utilized features and implemented capabilities of such device or system.

Also as used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as "either," "one of," "only one of," or "exactly one of." For example, a list of "one of A, B, or C" indicates options of: A, but not B and C; B, but not A and C; and C, but not A and B. A list preceded by "one or more" (and variations thereon) and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more of A, one or more of B, and one or more of C. Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: A and B; B and C; A and C; and A, B, and C.

Although exemplary implementations of the herein described systems and methods have been described in detail above, those skilled in the art will readily appreciate that many additional modifications are possible in the exemplary embodiments without materially departing from the novel teachings and advantages of the herein described systems and methods. Accordingly, these and all such modifications are intended to be included within the scope of the herein described systems and methods. The herein described systems and methods may be better defined by the following exemplary claims.

What is claimed is:

1. A seat occupancy sensor, the sensor comprising:
a junction;
a first circuit branch, the first circuit branch extending from the junction; and
a second circuit branch, the second circuit branch extending from the junction;
wherein the junction, the first circuit branch, and the second circuit branch together form a first circuit loop including a first trace and a second trace, the first trace and the second trace being connected via a contact switch arranged on the circuit loop, the contact switch having a closed position in which the first trace and the second trace are in contact with another and an open position in which the first trace and the second trace are not in contact with another.

2. The seat occupancy sensor of claim 1, wherein the first circuit branch further includes a second circuit loop.

3. The seat occupancy sensor of claim 2, wherein the second circuit branch includes a third circuit loop.

4. The seat occupancy sensor of claim 3, wherein the first circuit loop includes both the second circuit loop and the third circuit loop.

5. The seat occupancy sensor of claim 4, wherein the second circuit loop includes a contact switch arranged on the second circuit loop, and wherein the third circuit loop includes a contact switch arranged on the third circuit loop.

6. The seat occupancy sensor of claim 5, wherein the contact switch arranged on the second circuit loop is configured to receive current from the first trace both directly from the first circuit branch and through the first circuit loop via the second circuit branch.

7. The seat occupancy sensor of claim 6, wherein the contact switch arranged on the third circuit loop is configured to receive current from the first trace both directly from the second circuit branch and through the first circuit loop via the first circuit branch.

8. The seat occupancy sensor of claim 7, wherein the contact switch arranged on the third circuit loop functions even when the connection to the junction via the second circuit branch is broken.

9. The seat occupancy sensor of claim 6, wherein the contact switch arranged on the second circuit loop functions even when the connection to the junction via the first circuit branch is broken.

10. The seat occupancy sensor of claim 1, wherein the contact switch arranged on the first circuit loop includes at least two electrical connections to the first trace and at least two electrical connections to the second trace.

11. A seat occupancy sensor, the seat occupancy sensor comprising:
a sensor mat, the sensor mat including:
a first trace, a second trace, and a contact switch, the first trace and the second trace being connected via the contact switch, the contact switch having a closed position in which the first trace and the second trace are in contact with another and an open position in which the first trace and the second trace are not in contact with another;
a junction;
a first circuit branch, the first circuit branch including a first end connected to the junction;
a second circuit branch, the second circuit branch including a first end connected to the junction; and
wherein the junction, the first circuit branch, and the second circuit branch together form a first circuit loop including both the first trace and the second trace.

12. The seat occupancy sensor of claim 11, wherein the first circuit branch includes a second circuit loop independent of the first circuit loop.

13. The seat occupancy sensor of claim 12, wherein the second circuit branch includes a third circuit loop independent of the first and the second circuit loops.

14. The seat occupancy sensor of claim 13, wherein the second circuit loop includes a contact switch arranged on the second circuit loop, and wherein the third circuit loop includes a contact switch arranged on the third circuit loop.

15. The seat occupancy sensor of claim 14, wherein the contact switch arranged on the second circuit loop is configured to receive current from the first trace both directly from the first circuit branch and through the first circuit loop via the second circuit branch.

16. The seat occupancy sensor of claim 15, wherein the contact switch arranged on the second circuit loop functions even when the connection to the junction via the first circuit branch is broken.

17. A seat occupancy sensor, comprising:
a first sensor trace and a second sensor trace extending to a junction;
a first branch including first and second first branch traces extending from the junction with the first branch first trace electrically connected to the first sensor trace and the first branch second trace electrically connected to the second sensor trace;
a second branch including first and second second branch traces extending from the junction with the second branch first trace electrically connected to the first sensor trace and the second branch second trace electrically connected to the second sensor trace; and
a contact switch electrically connected to the first and second first branch traces and electrically connected to the first and second second branch traces.

18. The seat occupancy sensor of claim 17, wherein the first branch forms a first circuit loop, wherein the second branch forms a second circuit loop, and wherein the first branch and the second branch together form a third circuit loop.

19. The seat occupancy sensor of claim 17, wherein the contact switch functions even when a connection between the contact switch and the junction via either the first branch or the second branch is broken.

20. The seat occupancy sensor of claim 17, wherein the first branch, the second branch, and the contact switch together form a sensor mat of the seat occupancy sensor.

* * * * *